United States Patent
Yuki et al.

(10) Patent No.: US 10,464,215 B2
(45) Date of Patent: Nov. 5, 2019

(54) VOICE INTERACTION DEVICE AND CONTROL METHOD THEREFOR

(71) Applicant: TOYOTA JIDOSHA KABUSHIKI KAISHA, Toyota-shi, Aichi-ken (JP)

(72) Inventors: Mina Yuki, Toyota (JP); Shintaro Yoshizawa, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 171 days.

(21) Appl. No.: 15/677,140

(22) Filed: Aug. 15, 2017

(65) Prior Publication Data

US 2018/0093381 A1     Apr. 5, 2018

(30) Foreign Application Priority Data

Oct. 4, 2016 (JP) .................. 2016-196556

(51) Int. Cl.
  *B25J 11/00* (2006.01)
  *G06N 3/00* (2006.01)
  *G06F 3/01* (2006.01)
  *G06F 3/16* (2006.01)

(52) U.S. Cl.
  CPC ........ *B25J 11/0015* (2013.01); *B25J 11/0005* (2013.01); *G06F 3/011* (2013.01); *G06F 3/013* (2013.01); *G06N 3/008* (2013.01); *G06F 3/167* (2013.01); *G06F 2203/011* (2013.01)

(58) Field of Classification Search
  CPC ... B25J 11/0005; B25J 11/001; B25J 11/0015; G06N 3/008; A63H 3/40; A61F 2/14; A61F 2/141
  See application file for complete search history.

(56) References Cited

U.S. PATENT DOCUMENTS

| | | | |
|---|---|---|---|
| 2007/0198128 A1 | 8/2007 | Ziegler et al. | |
| 2009/0030552 A1 | 1/2009 | Nakadai et al. | |
| 2010/0188426 A1* | 7/2010 | Ohmori | G06F 3/012 345/660 |
| 2015/0165336 A1* | 6/2015 | Michalowski | A63H 29/22 446/330 |

(Continued)

FOREIGN PATENT DOCUMENTS

| | | |
|---|---|---|
| JP | 2002136672 A | 5/2002 |
| JP | 2003251580 A | 9/2003 |

(Continued)

*Primary Examiner* — Dale Moyer
(74) *Attorney, Agent, or Firm* — Sughrue Mion, PLLC

(57) ABSTRACT

Provided is a voice interaction device capable of reducing a sense of unfriendliness given to a conversation partner. The voice interaction device is incorporated in an interactive robot. The voice interaction device includes a display unit disposed at positions of eyes of the interactive robot and configured to display the eyes of the interactive robot; a distance measurement unit configured to measure a distance between the interactive robot and the conversation partner; and an eye control unit configured to set a size of each of pupils of the interactive robot displayed on the display unit when the distance measured by the distance measurement unit is less than a predetermined distance to be larger than a size of each of the pupils displayed on the display unit when the measured distance is equal to or more than the predetermined distance.

7 Claims, 15 Drawing Sheets

(56) References Cited

U.S. PATENT DOCUMENTS

| | | | |
|---|---|---|---|
| 2017/0244942 A1* | 8/2017 | Ma | H04N 9/3152 |
| 2018/0333862 A1* | 11/2018 | Hayashi | A63H 11/10 |
| 2018/0370039 A1* | 12/2018 | Nakagome | B25J 9/1697 |
| 2019/0030723 A1* | 1/2019 | Hayashi | B25J 9/1664 |
| 2019/0077018 A1* | 3/2019 | Hayashi | B25J 5/007 |
| 2019/0077021 A1* | 3/2019 | Hayashi | A61B 10/0012 |

FOREIGN PATENT DOCUMENTS

| | | |
|---|---|---|
| JP | 2004-198656 A | 7/2004 |
| JP | 2009207730 A | 9/2009 |
| JP | 2012-138086 A | 7/2012 |

\* cited by examiner

WHEN DISTANCE BETWEEN ROBOT
AND CONVERSATION PARTNER IS
SHORT

WHEN DISTANCE BETWEEN ROBOT
AND CONVERSATION PARTNER IS
LONG

VOICE INTERACTION DEVICE AND CONTROL METHOD THEREFOR

CROSS REFERENCE TO RELATED APPLICATIONS

This application is based upon and claims the benefit of priority from Japanese patent application No. 2016-196556, filed on Oct. 4, 2016, the disclosure of which is incorporated herein in its entirety by reference.

BACKGROUND

The present invention relates to a voice interaction device incorporated in an interactive robot, and a control method therefor.

In recent years, a voice interaction device that is incorporated in an interactive robot and performs a voice interaction with a conversation partner has been put into practical use. For example, Japanese Unexamined Patent Application Publication No. 2004-198656 discloses a voice interaction device that causes an interactive robot to follow a motion of a conversation partner with its eyes.

SUMMARY

However, the voice interaction device disclosed in Japanese Unexamined Patent Application Publication No. 2004-198656 has a problem that when the distance between the interactive robot and the conversation partner is changed, the interactive robot is not caused to perform the operation according to the change, which gives the conversation partner a sense of unfriendliness.

The present invention has been made in view of the above-mentioned circumstances, and an object of the present invention is to provide a voice interaction device capable of reducing a sense of unfriendliness given to a conversation partner, and a control method for the voice interaction device.

A voice interaction device according to one aspect of the present invention is a voice interaction device that is incorporated in an interactive robot, including: a display unit disposed at positions of eyes of the interactive robot and configured to display the eyes of the interactive robot; a distance measurement unit configured to measure a distance between the interactive robot and a conversation partner; and an eye control unit configured to set a size of each of pupils of the interactive robot displayed on the display unit when the distance measured by the distance measurement unit is less than a predetermined distance to be larger than a size of each of the pupils displayed on the display unit when the measured distance is equal to or more than the predetermined distance.

A control method for a voice interaction device according to another aspect of the present invention is a control method for a voice interaction device incorporated in an interactive robot, the control method including: measuring a distance between the interactive robot and a conversation partner; and setting a size of each of pupils of the interactive robot displayed on a display unit when the measured distance is less than a predetermined distance to be larger than a size of each of the pupils displayed on the display unit when the measured distance is equal to or more than the predetermined distance.

According to the above-mentioned aspects of the present invention, the size of each of the pupils of the interactive robot displayed on the display unit when the distance between the interactive robot and the conversation partner is less than the predetermined distance is set to be larger than the size of each of the pupils displayed on the display unit when the distance between the interactive robot and the conversation partner is equal to or more than the predetermined distance. Therefore, an advantageous effect that a sense of unfriendliness given to the conversation partner can be reduced is obtained.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Embodiments of the present invention will be described below with reference to the drawings.

(1) First Embodiment

(1-1) Configuration of First Embodiment

Figure 1:
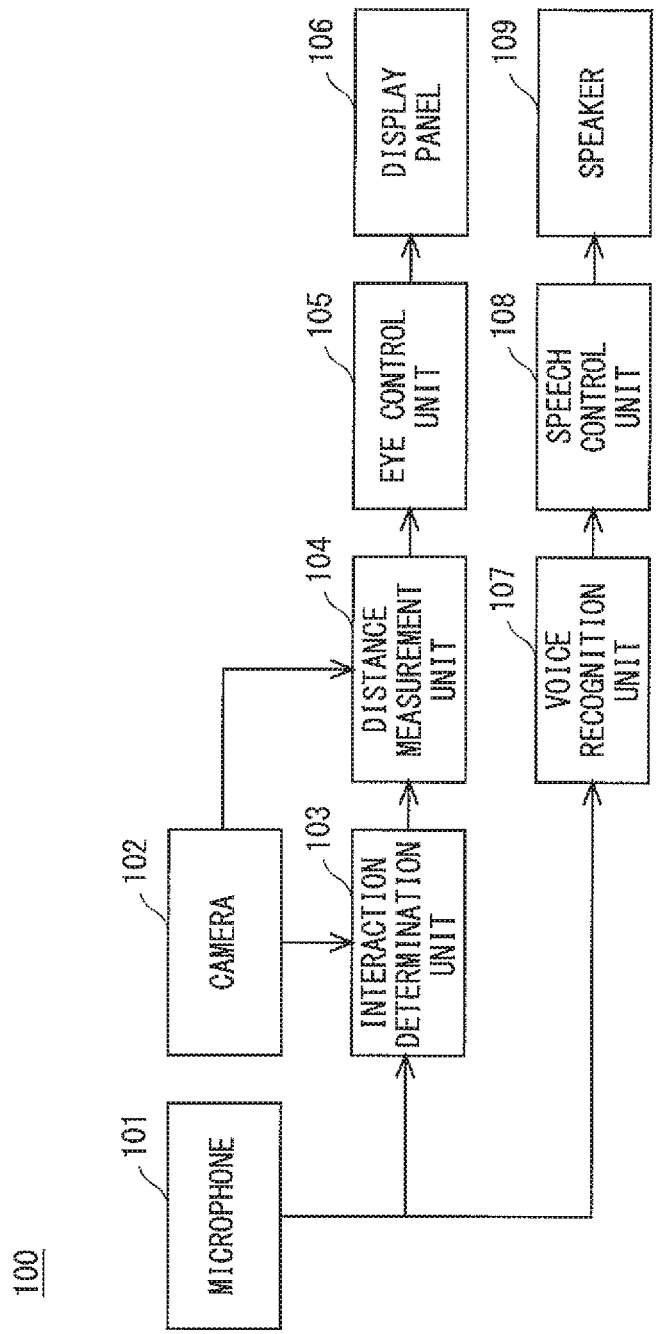
FIG. 1 is a block diagram showing a configuration example of a voice interaction device according to a first embodiment.
Figure 2:
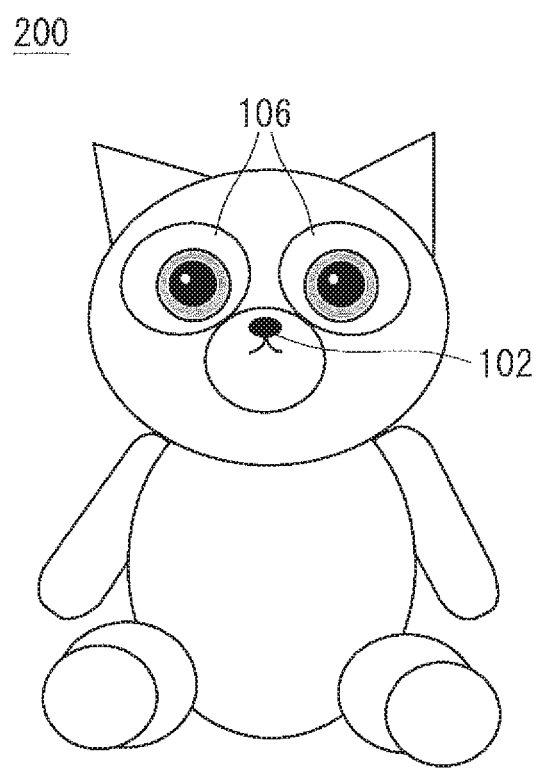
FIG. 2 is a diagram showing an appearance structure example of an interactive robot incorporating the voice interaction device according to first to fourth embodiments.

First, a configuration of a first embodiment will be described. FIG. 1 is a block diagram showing a configuration example of a voice interaction device 100 according to the first embodiment. FIG. 2 is a diagram showing an appearance structure example of an interactive robot 200 which is incorporated in the voice interaction device 100 according to the first embodiment. The interactive robot 200 shown in FIG. 2 is an animal-shaped robot. However, the appearance structure of the interactive robot 200 is not limited to this.

As shown in FIG. 1, the voice interaction device 100 according to the first embodiment includes a microphone 101, a camera 102, an interaction determination unit 103, a distance measurement unit 104, an eye control unit 105, display panels 106, a voice recognition unit 107, a speech control unit 108, and a speaker 109.

The microphone 101 collects sound such as a speech voice of a conversation partner.

The camera 102 photographs the image of the conversation partner and images in the vicinity of the conversation partner. In the first embodiment, the camera 102 is disposed at a position corresponding to the nose of the interactive robot 200. However, the position where the camera 102 is disposed is not limited to this.

The interaction determination unit 103 determines whether or not the interactive robot 200 is making conversation with the conversation partner, based on the collected sound collected by the microphone 101 and the photographed image photographed by the camera 102. In the first embodiment, the interaction determination unit 103 determines that the interactive robot is making conversation with the conversation partner when the volume of the collected sound exceeds a threshold and the conversation partner is captured in the photographed image.

Figure 3:
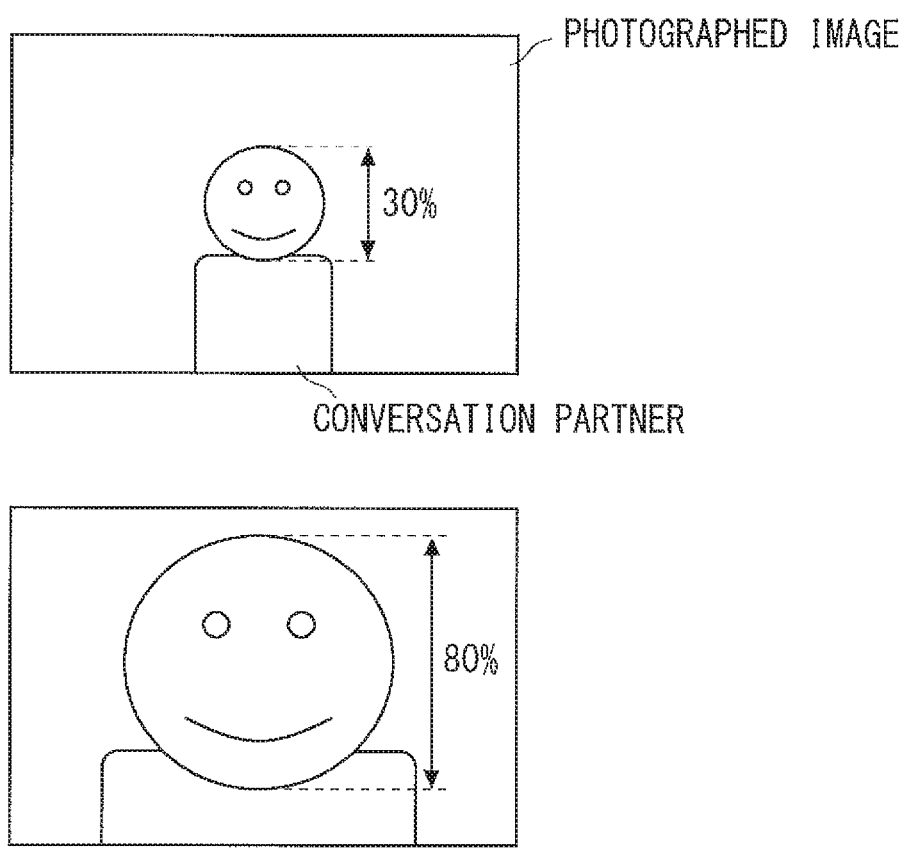
FIG. 3 is a diagram showing an example of a method for measuring a distance between an interactive robot and a conversation partner.

When the interaction determination unit 103 determines that the interactive robot is making conversation with the conversation partner, the distance measurement unit 104 measures a distance between the interactive robot 200 and the conversation partner based on the face of the conversation partner captured in the photographed image photographed by the camera 102. For example, in the example shown in FIG. 3, the distance between the interactive robot and the conversation partner is measured based on the ratio of the longitudinal length of the face of the conversation partner to the longitudinal length of the screen of the photographed image. An upper part of FIG. 3 illustrates an example in which the distance between the interactive robot and the conversation partner is long and the ratio is 30%. On the other hand, a lower part of FIG. 3 illustrates an example in which the distance between the interactive robot and the conversation partner is short and the ratio is 80%. However, the method for measuring the distance between the interactive robot and the conversation partner is not limited to this. For example, a distance between feature points on the face of the conversation partner captured in the photographed image (for example, a distance between the top of the head of the conversation partner to tip of the chin thereof) may be measured and the distance between the interactive robot and the conversation partner may be measured based on the measured distance between the feature points.

The display panels 106 are respectively located at positions corresponding to the eyes of the interactive robot 200, and display the eyes of the interactive robot 200. The display panels 106 are, for example, liquid crystal panels or organic EL (Electro Luminescence) panels, and are an example of a display unit.

Figure 4:
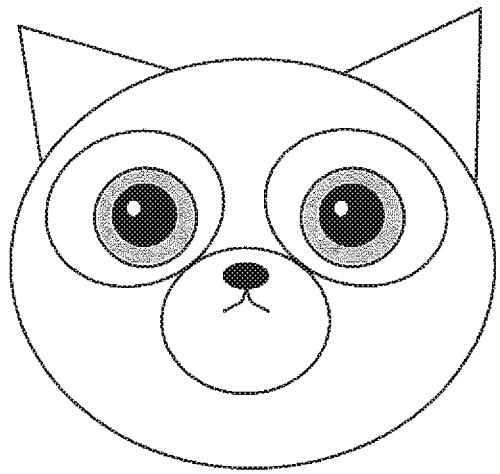
FIG. 4 is a diagram showing an example in which the size of each of the pupils of the interactive robot is changed depending on the distance.
Figure 4:
Figure 4:
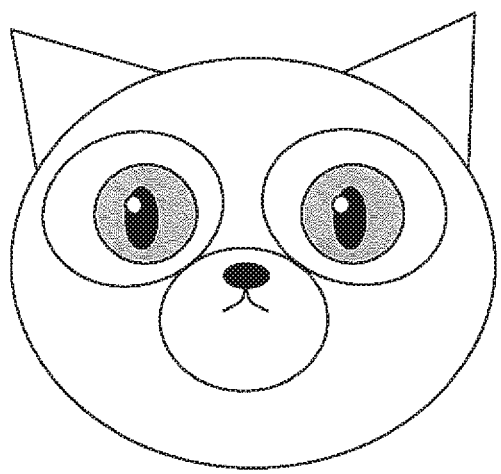

The eye control unit 105 determines the size of each of the pupils of the interactive robot 200 displayed on the display panels 106 based on the distance between the interactive robot and the conversation partner that is measured by the distance measurement unit 104, and sets the size of each of the pupils displayed on the display panels 106 to the determined size. Schematically, as shown in FIG. 4, the eye control unit 105 increases the size of each of the pupils when the distance between the interactive robot and the conversation partner is short, and the eye control unit 105 reduces the size of each of the pupils when the distance between the interactive robot and the conversation partner is long. Specifically, the eye control unit 105 sets the size of each of the pupils when the distance between the interactive robot and the conversation partner is less than a predetermined distance to be larger than the size of each of the pupils when the distance between the interactive robot and the conversation partner is equal to or more than the predetermined distance. The predetermined distance can be set to any value (for example, 5 m).

The voice recognition unit 107 recognizes collected sound collected by the microphone 101.

When the voice recognition unit 107 recognizes the speech voice of the conversation partner, the speech control unit 108 generates a response sentence for the speech voice of the conversation partner. For example, the speech control unit 108 may hold a database in which the content of the speech of the conversation partner is associated with the response sentence corresponding to the speech, and may generate the response sentence corresponding to the content of the speech of the conversation partner by using the database. However, the particular method for generating the response sentence is not essential for the present invention, and various well-known methods can be used.

The speaker 109 outputs the response sentence, which is generated by the speech control unit 108, as a voice.

The method for determining the size of each of the pupils of the interactive robot 200 in the first embodiment will be described below.

Figure 5:
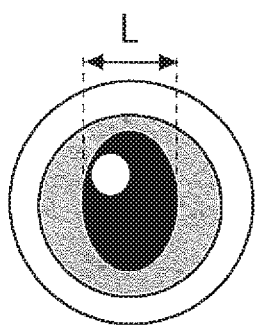
FIG. 5 is a diagram showing an example of the size of each of the pupils of the interactive robot.

As shown in FIG. 5, the lateral width of each pupil is represented by a size L. L is derived by the following formula (1).

$$L = A \times L_{max} \qquad (1)$$

where A represents the aperture [%] of each pupil, and $L_{max}$ represents a maximum value of the size of each pupil.

Figure 6:
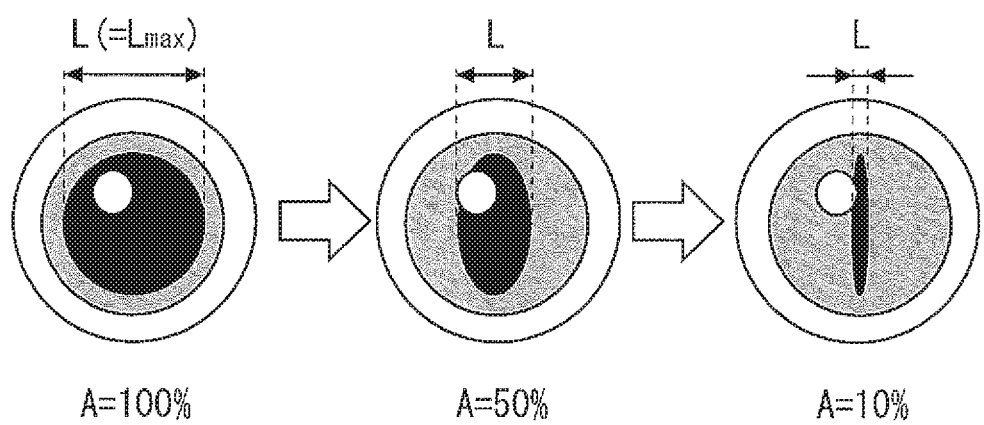
FIG. 6 is a diagram showing an example in which the size of each of the pupils of the interactive robot is displayed at three levels.

FIG. 6 shows examples of the pupil with the aperture of 100%, 50%, and 10%. The size L of the pupil when A=100% has the maximum value $L_{max}$.

Further, in the first embodiment, the size L of the pupil is determined based on the distance between the interactive robot and the conversation partner. Accordingly, A is derived by the following formula (2).

$$A = d_k \qquad (2)$$

where $d_k$ represents the aperture [%] of each pupil that is determined depending on the distance between the interactive robot and the conversation partner.

The aperture $d_k$ is divided into a plurality of levels. The number of levels can be set to any value. The following Table 1 shows an example in which $d_k$ is divided into 10 levels of $d_1$ to $d_{10}$ according to the distance between the interactive robot and the conversation partner.

TABLE 1

| Distance | Aperture $d_k$ [%] |
|---|---|
| equal to or more than 5 m | $d_1 = 10$ [%] |
| equal to or more than 1 m and less than 5 m | $d_2 = 20$ [%] |
| . | . |
| . | . |
| . | . |
| equal to or more than 0.01 m and less than 0.05 m | $d_9 = 90$ [%] |
| less than 0.01 m | $d_{10} = 100$ [%] |

Table 1 shows an example in which the predetermined distance to be compared with the distance between the interactive robot and the conversation partner is 5 m. In the example shown in Table 1, the aperture $d_k$ obtained when the distance between the interactive robot and the conversation partner is equal to or more than 5 m is smaller than that obtained when the distance between the interactive robot and the conversation partner is less than 5 m, and the aperture is maintained uniformly at the level of $d_1$ (=10) [%]. On the other hand, in a case where the distance between the interactive robot and the conversation partner is less than 5 m, the aperture $d_k$ obtained when the distance between the interactive robot and the conversation partner is short is larger than that obtained when the distance between the interactive robot and the conversation partner is long.

Accordingly, when the example shown in Table 1 is applied, the eye control unit 105 sets the size of each of the pupils when the distance between the interactive robot and the conversation partner is less than 5 m to be larger than the size of each of the pupils when the distance between the interactive robot and the conversation partner is equal to or more than 5 m. Further, in the case where the distance between the interactive robot and the conversation partner is less than 5 m, the eye control unit 105 sets the size of each of the pupils when the distance between the interactive robot and the conversation partner is short to be larger than that when the distance between the interactive robot and the conversation partner is long.

(1-2) Operation of First Embodiment

Figure 7:
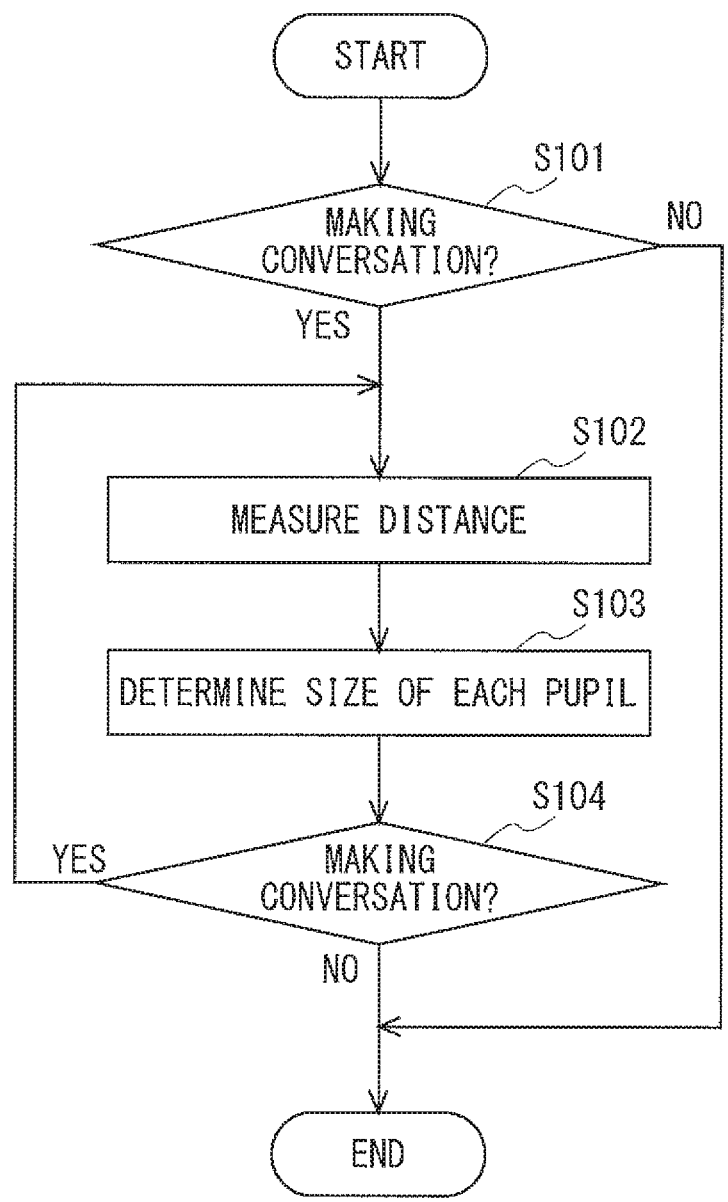
FIG. 7 is a flowchart showing an example of an operation associated with control for the eyes of the interactive robot in the voice interaction device according to the first embodiment.

Next, the operation of the first embodiment will be described. FIG. 7 is a flowchart showing an example of an operation associated with control for the eyes of the interactive robot 200 in the voice interaction device 100 according to the first embodiment.

As shown in FIG. 7, the interaction determination unit 103 first determines whether or not the interactive robot 200 is making conversation with the conversation partner (step S101). When it is not determined that the interactive robot is making conversation with the conversation partner in step S101 (NO in step S101), the process ends.

On the other hand, when it is determined that the interactive robot is making conversation with the conversation partner in step S101 (YES in step S101), the distance measurement unit 104 measures the distance between the interactive robot 200 and the conversation partner (step S102). Subsequently, the eye control unit 105 determines the size of each of the pupils of the interactive robot 200 displayed on the display panels 106, based on the distance between the interactive robot and the conversation partner that is measured by the distance measurement unit 104, and sets the size of each of the pupils displayed on the display panels 106 to the determined size (step S103). At this time, the eye control unit 105 can determine the size of each pupil by using, for example, the aperture A of each pupil to which the example shown in Table 1 is applied and Formula (1). Next, the process proceeds to step S104.

In step S104, the interaction determination unit 103 determines again whether or not the interactive robot 200 is making conversation with the conversation partner. When it is not determined that the interactive robot is making conversation with the conversation partner in step S104 (NO in step S104), the process ends. On the other hand, when it is determined that the interactive robot is making conversation with the conversation partner in step S104 (YES in step S104), the process returns to step S102 and the process of step S102 and subsequent steps is repeated.

(1-3) Advantageous Effects of First Embodiment

As described above, the voice interaction device 100 according to the first embodiment measures the distance between the interactive robot 200 and the conversation partner, and sets the size of each of the pupils of the interactive robot 200 displayed on the display panels 106 when the distance between the interactive robot and the conversation partner is less than the predetermined distance to be larger than the size of each of the pupils of the interactive robot 200 displayed on the display panels 106 when the distance between the interactive robot and the conversation partner is equal to or more than the predetermined distance. Accordingly, when the conversation partner approaches the interactive robot 200 and the distance between the interactive robot and the conversation partner is less than the predetermined distance, the size of each of the pupils of the interactive robot 200 is increased. Thus, the interactive robot 200 can make motions like an animal, so that a sense of unfriendliness given to the conversation partner by the interactive robot 200 can be reduced. Further, the interactive robot 200 can show the conversation partner that the interactive robot 200 has recognized the behavior of the conversation partner. This allows the conversation partner to have a sense of affinity in the interactive robot 200 or have a sense of emotional attachment to the interactive robot 200.

Further, in the case where the distance between the interactive robot and the conversation partner is less than the predetermined distance, the voice interaction device 100 according to the first embodiment sets the size of each of the pupils of the interactive robot 200 displayed on the display panels 106 when the distance between the interactive robot and the conversation partner is short to be larger than the size of each of the pupils of the interactive robot 200 displayed on the display panels 106 when the distance between the interactive robot and the conversation partner is long. Accordingly, the size of each of the pupils of the interactive robot 200 is changed depending on the distance even when the distance between the interactive robot and the conversation partner is less than the predetermined distance. Therefore, the interactive robot 200 can make a behavior that is similar to the behavior of an animal.

Further, the voice interaction device 100 according to the first embodiment determines whether or not the interactive robot is making conversation with the conversation partner, and controls the eyes (sizes of pupils) of the interactive robot 200 only when the interactive robot is making conversation with the conversation partner. Accordingly, since the voice interaction device does not control the eyes of the interactive robot in cases other than the case where the interactive robot is making conversation with the conversation partner, when the voice interaction device 100 is driven by a battery, the battery life can be improved.

(2) Second Embodiment

The size of each pupil of a real animal (for example, a cat) varies depending on the brightness of a location where the animal is located.

In a second embodiment, the size of each of the pupils of the interactive robot 200 displayed on the display panels 106 is changed depending on the brightness of an installation environment in which the interactive robot 200 is installed.

(2-1) Configuration of Second Embodiment

Figure 8:
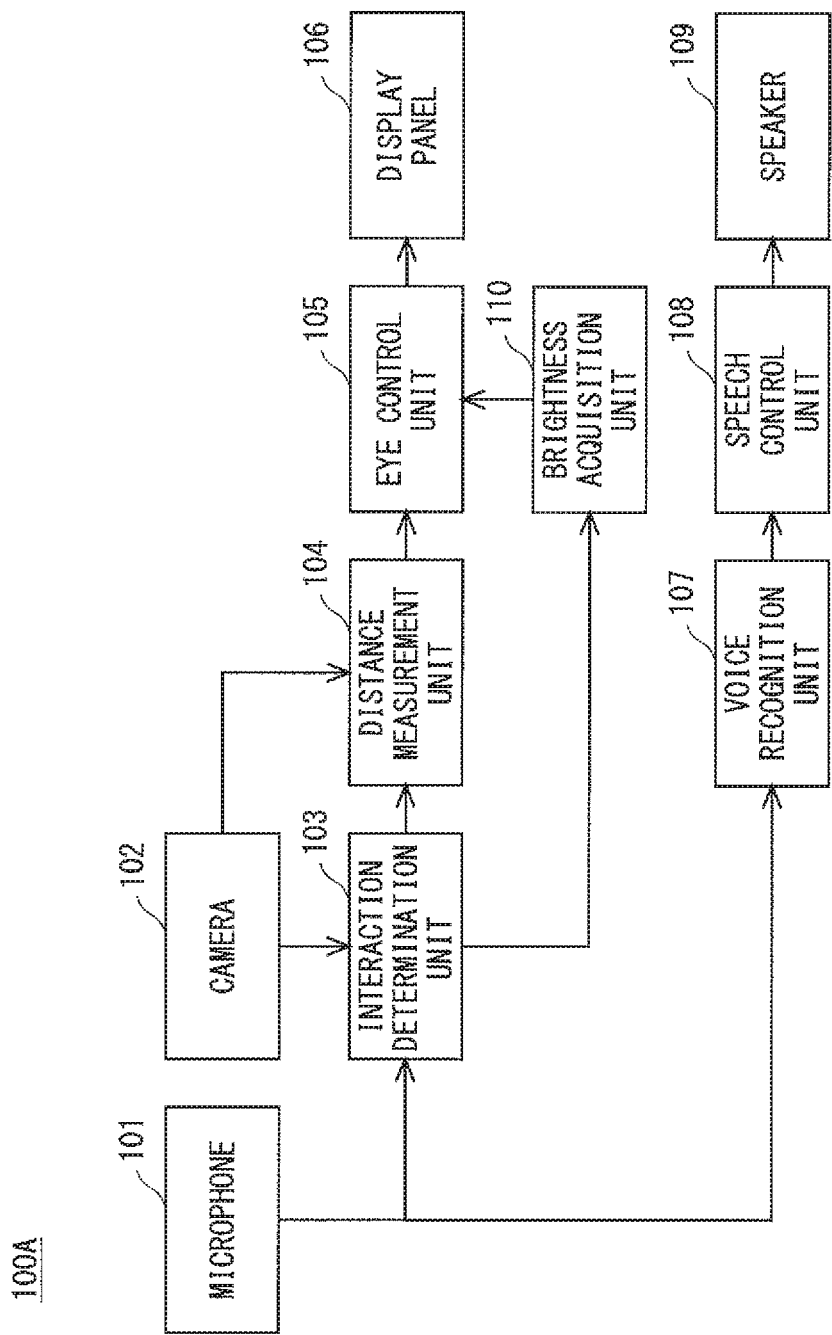
FIG. 8 is a block diagram showing a configuration example of a voice interaction device according to a second embodiment.

First, the configuration of the second embodiment will be described. FIG. 8 is a block diagram showing a configuration example of a voice interaction device 100A according to the second embodiment. The voice interaction device 100A according to the second embodiment is incorporated in, for example, the interactive robot 200 shown in FIG. 2, like the voice interaction device 100 according to the first embodiment.

As shown in FIG. 8, the configuration of the voice interaction device 100A according to the second embodiment differs from the configuration of the voice interaction device 100 according to the first embodiment described above with reference to FIG. 1 in that a brightness acquisition unit 110 is added. The components of the second embodiment that are different from those of the first embodiment and the components having an operation different from that of the first embodiment will be described below.

The brightness acquisition unit 110 acquires the brightness of the installation environment in which the interactive robot 200 is installed, when the interaction determination unit 103 determines that the interactive robot is making conversation with the conversation partner. The brightness may be measured by the brightness acquisition unit 110 itself, or the brightness acquisition unit 110 may acquire the brightness measured by an illuminance sensor or the like (not shown) located in the installation environment.

The eye control unit 105 determines the size of each of the pupils of the interactive robot 200 displayed on the display panels 106, based on the distance between the interactive robot 200 and the conversation partner that is measured by the distance measurement unit 104 and the brightness of the installation environment of the interactive robot 200 that is acquired by the brightness acquisition unit 110. Schematically, when the brightness of the installation environment is low, the eye control unit 105 increases the size of each pupil of the interactive robot, and when the brightness of the installation environment is high, the eye control unit 105 reduces the size of each pupil of the interactive robot. Specifically, the eye control unit 105 sets the size of each pupil when the brightness of the installation environment is less than a predetermined brightness to be larger than the size of pupil when the brightness of the installation environment is equal to or more than the predetermined brightness. The predetermined brightness can be set to any value (for example, 100000 lux) depending on the set environment or the like.

The method for determining the size of each of the pupils of the interactive robot 200 in the second embodiment will be described below.

In the second embodiment, the size L of each pupil is derived by the above-mentioned formula (1), like in the first embodiment.

However, in the second embodiment, the size L of each pupil is determined based on the distance between the interactive robot and the conversation partner and the brightness of the installation environment. Accordingly, A is derived by the following formula (3).

$$A = d_k \times c_m \qquad (3)$$

where $c_m$ represents the aperture [%] of each pupil that is determined depending on the brightness of the installation environment.

The aperture $c_m$ is divided into a plurality of levels. The number of levels can be set to any value. The following Table 2 shows an example in which $c_m$ is divided into six levels of $c_1$ to $c_6$ according to the brightness of the installation environment.

TABLE 2

| Brightness | Aperture $c_m$ [%] |
| --- | --- |
| equal to or more than 100000 lux | $c_1$ = 75 [%] |
| equal to or more than 10000 lux and less than 100000 lux | $c_2$ = 80 [%] |
| . | . |
| . | . |
| . | . |
| equal to or more than 1 lux and less than 10 lux | $c_5$ = 95 [%] |
| less than 1 lux | $c_6$ = 100 [%] |

Table 2 shows an example in which the predetermined brightness to be compared with the brightness of the installation environment is 100000 lux. In the example shown in Table 2, the aperture $c_m$ obtained when the brightness of the installation environment is equal to or more than 100000 lux is smaller than that obtained when the brightness of the installation environment is less than 100000 lux, and the aperture is maintained uniformly at the level of $c_1$ (=75) [%]. On the other hand, in a case where the brightness of the installation environment is less than 100000 lux, the aperture $c_m$ obtained when the brightness of the installation environment is high is set to be larger than that obtained when the brightness of the installation environment is low.

Accordingly, when the example shown in Table 2 is applied, the eye control unit 105 sets the size of each pupil when the brightness of the installation environment is less than 100000 lux to be larger than the size of each pupil when the brightness of the installation environment is equal to or more than 100000 lux. Further, in the case where the brightness of the installation environment is less than 100000 lux, the eye control unit 105 sets the size of each pupil when the brightness of the installation environment is high to be larger than the size of each pupil when the brightness of the installation environment is low.

Note that the example shown in Table 1 can be applied to the aperture $d_k$. When the examples shown in Table 1 and Table 2 are applied, the aperture $d_k$ of each pupil that is determined depending on the distance between the interactive robot and the conversation partner is 10 to 100 [%], while the aperture $c_m$ of each pupil that is determined depending on the brightness of the installation environment is 75 to 100 [%]. Accordingly, the size of each pupil depends more on the distance between the interactive robot and the conversation partner than on the brightness of the installation environment. Note that the ranges of $d_k$ and $c_m$ are not limited to those in the examples shown in Table 1 and Table 2, and may be arbitrarily set as long as the size of each pupil depends more on the distance between the interactive robot and the conversation partner.

(2-2) Operation of Second Embodiment

Figure 9:
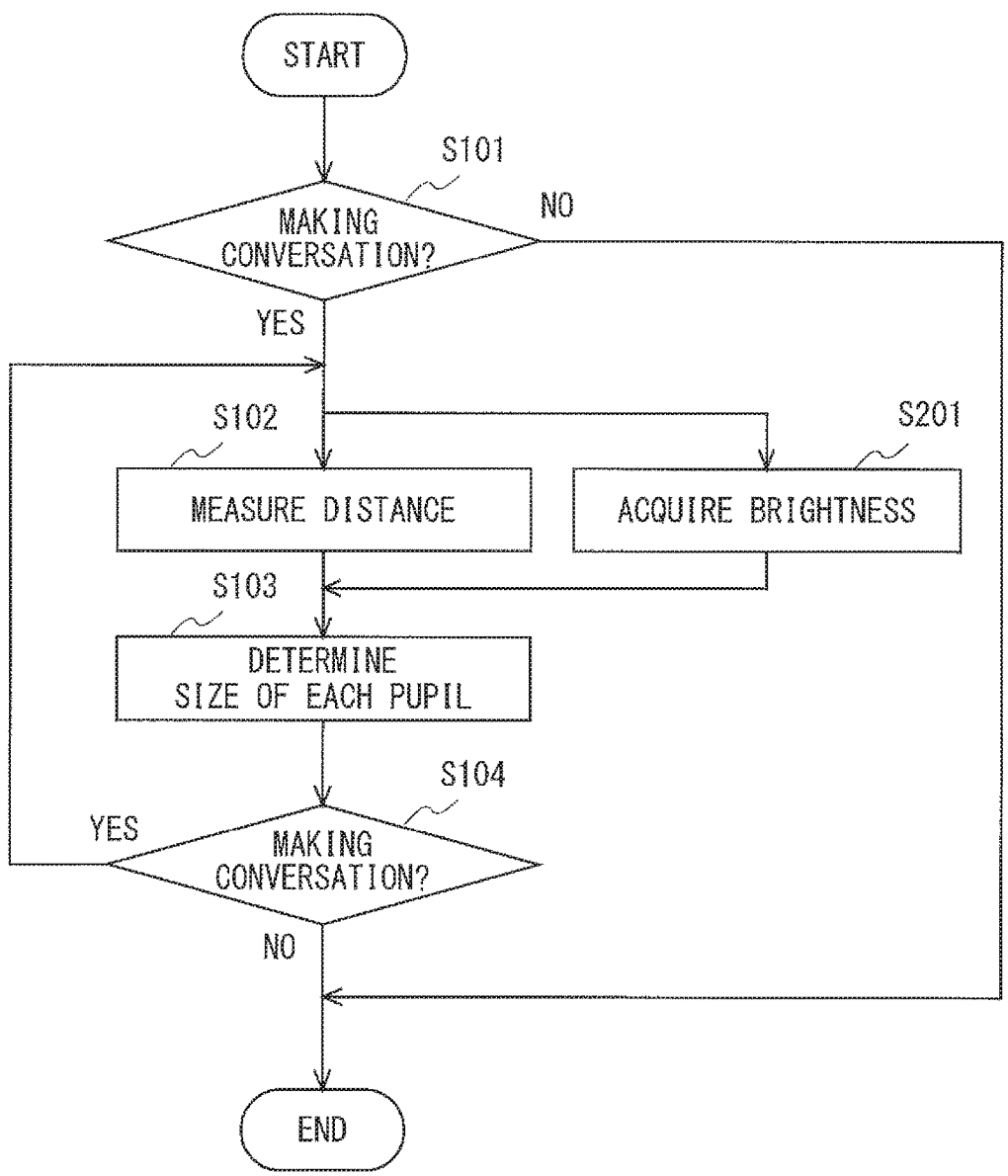
FIG. 9 is a flowchart showing an example of an operation associated with control for the eyes of an interactive robot in the voice interaction device according to the second embodiment.

Next, the operation of the second embodiment will be described. FIG. 9 is a flowchart showing an example of an operation associated with control for the eyes of the interactive robot 200 in the voice interaction device 100A according to the second embodiment. The process shown in FIG. 9 differs from the process in the first embodiment described above with reference to FIG. 7 in that step S201 is added.

As shown in FIG. 9, first, the process of step S101 similar to that shown in FIG. 7 is carried out. When it is not determined that the interactive robot is making conversation with the conversation partner in step S101 (NO in step S101), the process ends.

On the other hand, when it is determined that the interactive robot is making conversation with the conversation partner in step S101 (YES in step S101), the brightness acquisition unit 110 acquires the brightness of the installation environment of the interactive robot 200 (step S201), in parallel with the process of step S102 similar to that shown in FIG. 7. In the subsequent step S103, the eye control unit 105 determines the size of each of the pupils of the interactive robot 200 displayed on the display panels 106, based on the distance between the interactive robot and the conversation partner that is measured by the distance measurement unit 104 and the brightness of the installation environment that is acquired by the brightness acquisition unit 110, and sets the size of each of the pupils displayed on the display panels 106 to the determined size. At this time, the eye control unit 105 can determine the size of each pupil by using, for example, the aperture A of each pupil to which the examples shown in Table 1 and Table 2 are applied and Formula (1).

After that, the process of step S104 similar to that shown in FIG. 7 is carried out. When it is not determined that the interactive robot is making conversation with the conversation partner in step S104 (NO in step S104), the process ends. On the other hand, when it is determined that the interactive robot is making conversation with the conversation partner in step S104 (YES in step S104), the process returns to steps S102 and S201, and the process of steps S102 and 201 and subsequent steps is carried out.

(2-3) Advantageous Effects of Second Embodiment

As described above, the voice interaction device 100A according to the second embodiment acquires the brightness of the installation environment in which the interactive robot 200 is installed, and sets the size of each of the pupils of the interactive robot 200 displayed on the display panels 106 when the brightness of the installation environment is less than the predetermined brightness to be larger than the size of each of the pupils of the interactive robot 200 displayed on the display panels 106 when the brightness of the installation environment is equal to or more than the predetermined brightness. Accordingly, the size of each of the pupils of the interactive robot 200 is changed depending on the brightness of the installation environment. Therefore, the interactive robot 200 can make a behavior that is similar to the behavior of an animal.

The other advantageous effects are similar to those of the first embodiment.

(3) Third Embodiment

In the second embodiment, the brightness of the installation environment of the interactive robot 200 is acquired and the size of each of the pupils of the interactive robot 200 displayed on the display panels 106 is changed depending on the acquired brightness. However, in some installation environments, the brightness of the installation environment of the interactive robot 200 may be determined depending on a time zone, without the need for acquiring the brightness.

In a third embodiment, the size of each of the pupils of the interactive robot 200 displayed on the display panels 106 is changed depending on the time zone.

(3-1) Configuration of Third Embodiment

Figure 10:
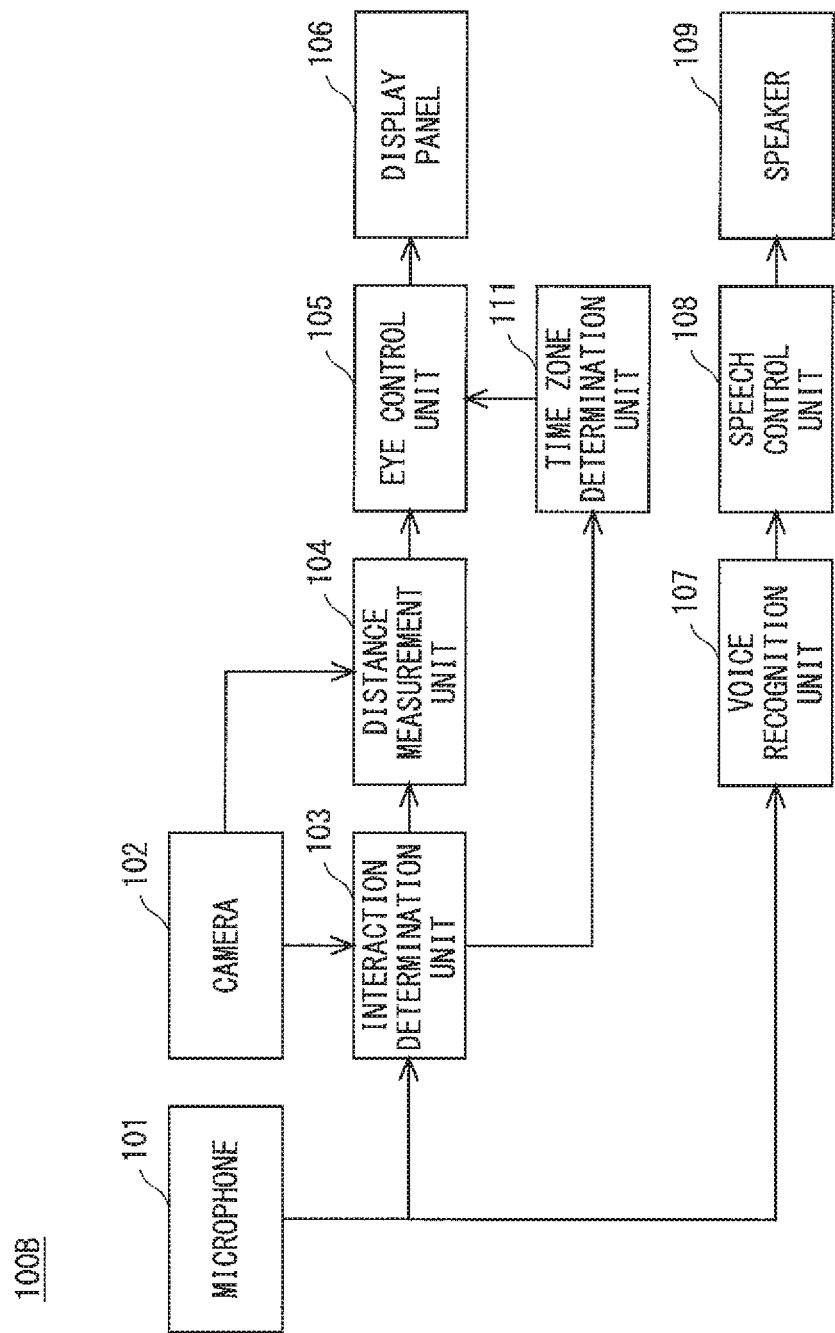
FIG. 10 is a block diagram showing a configuration example of a voice interaction device according to a third embodiment.

First, the configuration of the third embodiment will be described. FIG. 10 is a block diagram showing a configuration example of a voice interaction device 100B according to the third embodiment. Note that the voice interaction device 100B according to the third embodiment is incorporated in, for example, the interactive robot 200 shown in FIG. 2, like the voice interaction device 100 according to the first embodiment.

As shown in FIG. 10, the configuration of the voice interaction device 100B according to the third embodiment differs from the configuration of the voice interaction device 100 according to the first embodiment described above with reference to FIG. 1 in that a time zone determination unit 111 is added. The components of the third embodiment that are different from those of the first embodiment and the components having an operation different from that of the first embodiment will be described below.

The time zone determination unit 111 first acquires a current time when the interaction determination unit 103 determines that the interactive robot is making conversation with the conversation partner. The time zone determination unit 111 may have a clock function, or may acquire the current time from a clock unit (not shown). Further, the time zone determination unit 111 determines which one of a plurality of preset time zones the current time belongs to. In the third embodiment, the plurality of time zones correspond to morning, daytime, and evening, respectively. However, the plurality of time zones can be arbitrarily set. For example, early evening may be added, or only daytime and evening may be set. The time that belongs to each time zone can be arbitrarily set according to the life rhythm or the like of the conversation partner.

The eye control unit 105 determines the size of each of the pupils of the interactive robot 200 displayed on the display panels 106, based on the distance between the interactive robot and the conversation partner that is measured by the distance measurement unit 104 and the time zone determined by the time zone determination unit 111. In this case, the eye control unit 105 holds, as data on the brightness of the time zones of morning, daytime, and evening, data indicating that the brightness of the time zone of morning is medium; the brightness of the time zone of daytime is high; and the brightness of the time zone of evening is low. The eye control unit 105 determines the size of each of the pupils of the interactive robot 200 displayed on the display panels 106 by using the data. Schematically, the eye control unit 105 sets the size of each pupil when the time zone determined by the time zone determination unit 111 has a low brightness to be larger than the size of each pupil when the time zone determined by the time zone determination unit 111 has a high brightness. Specifically, the eye control unit 105 sets the size of each pupil in such a manner that the size of each pupil is largest in the time zone of evening; the size of each pupil is second largest in the time zone of morning; and the size of each pupil is smallest in the time zone of daytime.

The method for determining the size of each of the pupils of the interactive robot 200 in the third embodiment will be described below.

In the third embodiment, the size L of each pupil is derived by the above-mentioned formula (1), like in the first embodiment.

However, in the third embodiment, the size L of each pupil is determined based on the distance between the interactive robot and the conversation partner and the time zone to which the current time belongs. Accordingly, A is derived by the following formula (4).

$$A = d_k \times T_i \quad (4)$$

where $T_i$ represents the aperture [%] of each pupil that is determined depending on the time zone.

Figure 11:
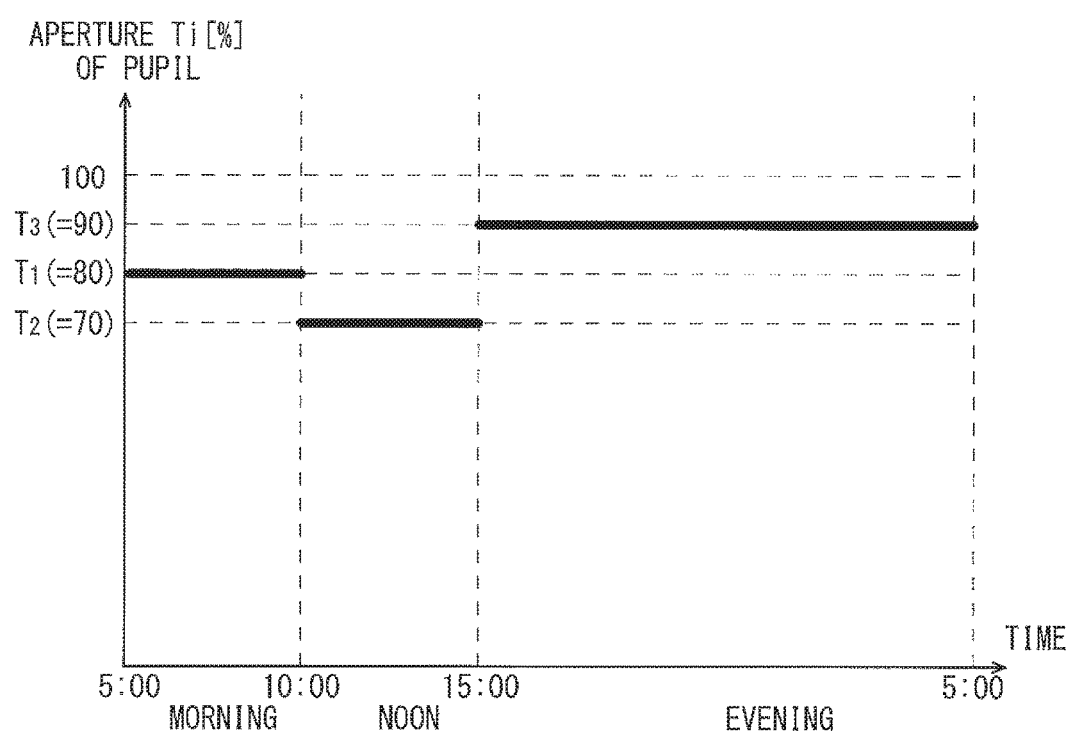
FIG. 11 is a diagram showing an example of an aperture of each pupil of an interactive robot depending on a time zone.

FIG. 11 shows an example of $T_i$. In the example shown in FIG. 11, the time zone of morning is from 5 a.m. to 10 a.m., and the aperture $T_i$ in the time zone is $T_1$ (=80) [%]. The time zone of daytime is from 10 a.m. to 3 p.m., and the aperture $T_i$ in the time zone is $T_2$ (=70) [%]. The time zone of evening is from 3 p.m. to 5 a.m., and the aperture $T_i$ in the time zone is $T_3$ (=90) [%]. Accordingly, when the example shown in FIG. 11 is applied, the eye control unit 105 sets the size of each pupil to be largest in the evening, sets the size of each pupil to be second largest in the morning, and sets the size of each pupil to be smallest at daytime.

Note that the example shown in Table 1 can be applied to the aperture $d_k$. When the examples shown in Table 1 and FIG. 11 are applied, the aperture $d_k$ of each pupil determined depending on the distance between the interactive robot and the conversation partner is 10 to 100 [%], and the aperture $T_i$ of each pupil determined depending on the time zone is 70 to 90 [%]. Accordingly, the size of each pupil depends more on the distance between the interactive robot and the conversation partner than on the time zone. Note that the ranges of $d_k$ and $T_i$ are not limited to those in the examples shown in Table 1 and FIG. 11, and may be arbitrarily set as long as the size of each pupil depends more on the distance between the interactive robot and the conversation partner.

(3-2) Operation of Third Embodiment

Figure 12:
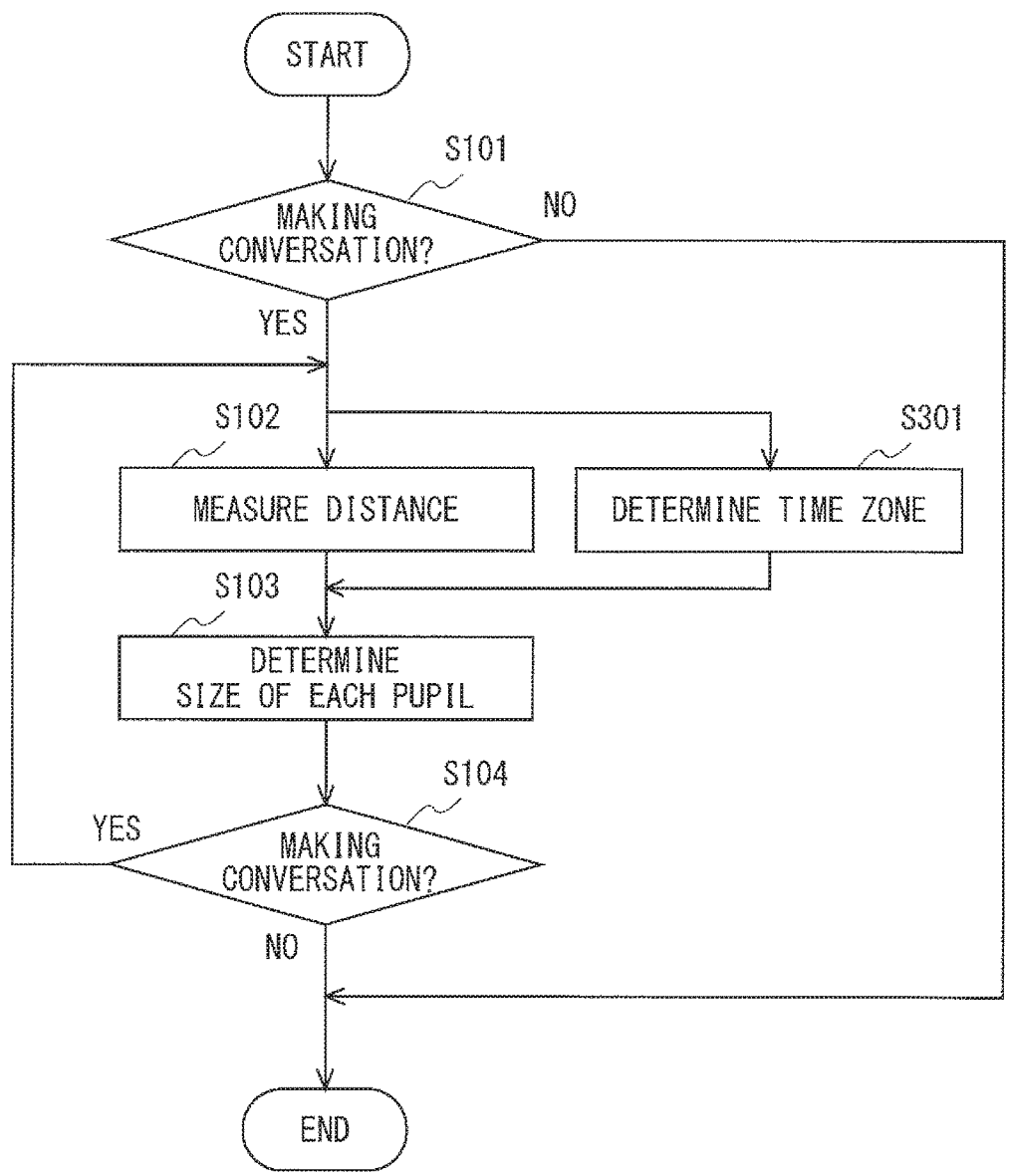
FIG. 12 is a flowchart showing an example of an operation associated with control for the eyes of the interactive robot in the voice interaction device according to the third embodiment.

Next, the operation of the third embodiment will be described. FIG. 12 is a flowchart showing an example of an operation associated with control for the eyes of the interactive robot 200 in the voice interaction device 100B according to the third embodiment. The process shown in FIG. 12 differs from the process in the first embodiment described above with reference to FIG. 7 in that step S301 is added.

As shown in FIG. 12, first, the process of step S101 similar to that shown in FIG. 7 is carried out. When it is not determined that the interactive robot is making conversation with the conversation partner in step S101 (NO in step S101), the process ends.

On the other hand, when it is determined that the interactive robot is making conversation with the conversation partner in step S101 (YES in step S101), the time zone determination unit 111 determines which one of the time zones, i.e., morning, daytime, and evening, the current time belongs to (step S301), in parallel with the process of step S102 similar to that shown in FIG. 7. In the subsequent step S103, the eye control unit 105 determines the size of each of the pupils of the interactive robot 200 displayed on the display panels 106, based on the distance between the interactive robot and the conversation partner that is measured by the distance measurement unit 104 and the time zone determined by the time zone determination unit 111, and sets the size of each of the pupils displayed on the display panels 106 to the determined size. At this time, the eye control unit 105 can determine the size of each pupil by using, for example, the aperture A of each pupil to which the examples shown in Table 1 and FIG. 11 are applied and Formula (1).

After that, the process of step S104 similar to that shown in FIG. 7 is carried out. When it is not determined that the interactive robot is making conversation with the conversation robot in step S104 (NO in step S104), the process ends. On the other hand, when it is determined that the interactive robot is making conversation with the conversation partner in step S104 (YES in step S104, the process returns to steps S102 and S301, and the process of steps S102 and S301 and subsequent steps is carried out.

(3-3) Advantageous Effects of Third Embodiment

As described above, the voice interaction device 100B according to the third embodiment determines which one of the times zones, i.e., morning, daytime, and evening, the current time belongs, and sets the size of each of the pupils of the interactive robot 200 displayed on the display panels 106 when the determined time zone has a low brightness to be larger than the size of each of the pupils displayed on the display panels 106 when the determined time zone has a high brightness. In this case, in some installation environments, the brightness may be determined depending on the time zone. Accordingly, in some installation environments, the size of each of the pupils of the interactive robot 200 is changed depending on the time zone, i.e., depending on the brightness of the installation environment. Therefore, the interactive robot 200 can make a behavior that is similar to the behavior of an animal. Further, since the size of each of the pupils of the interactive robot 200 is changed depending on the time zone, a feeling that the interactive robot is a family member with whom the conversation partner lives can be given to the conversation partner.

The other advantageous effects are similar to those of the first embodiment.

(4) Fourth Embodiment

In a fourth embodiment, the size of each of the pupils of the interactive robot 200 displayed on the display panels 106 is changed depending on the internal emotion of the interactive robot 200.

(4-1) Configuration of Fourth Embodiment

Figure 13:
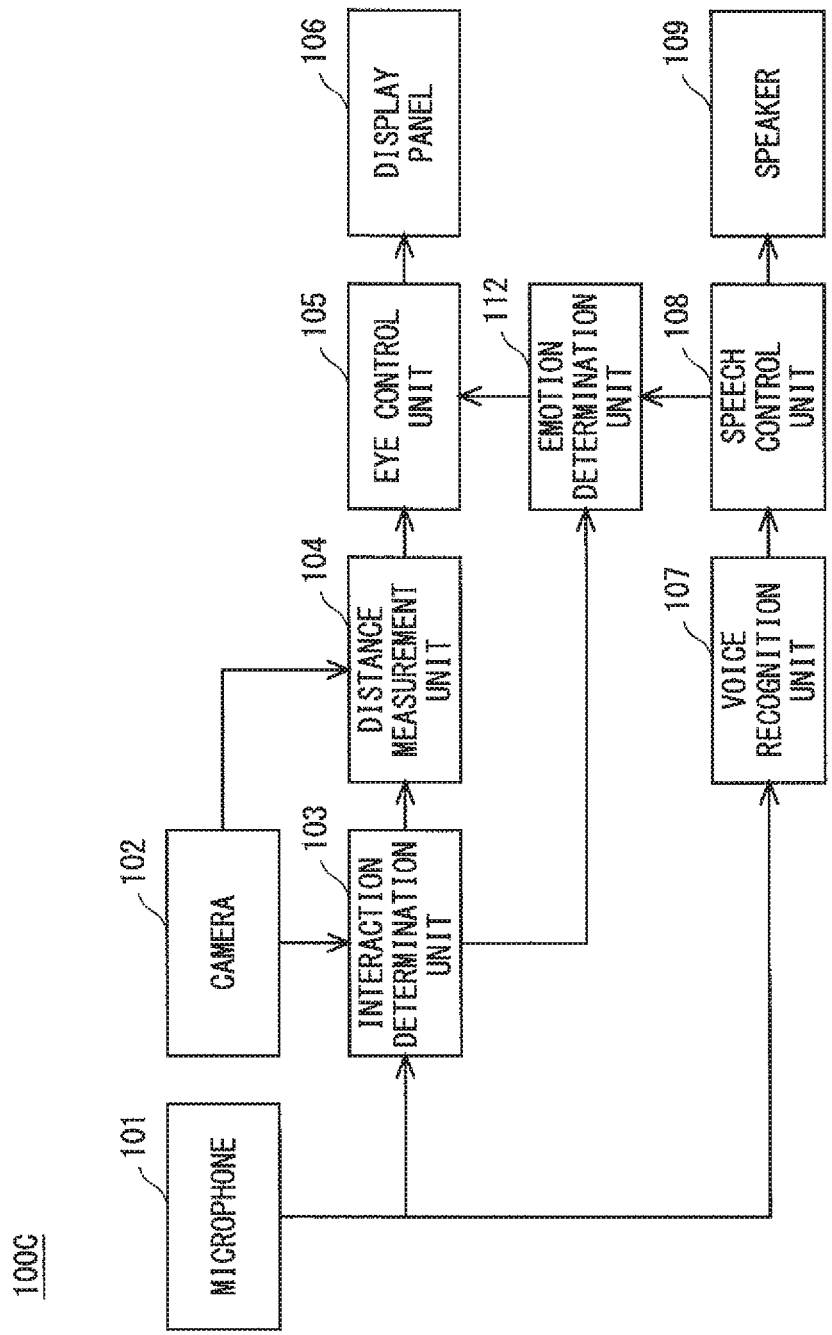
FIG. 13 is a block diagram showing a configuration example of a voice interaction device according to a fourth embodiment.

First, the configuration of the fourth embodiment will be described. FIG. 13 is a block diagram showing a configuration example of a voice interaction device 100C according to the fourth embodiment. Note that the voice interaction device 100C according to the fourth embodiment is incorporated in, for example, the interactive robot 200 shown in FIG. 2, like the voice interaction device 100 according to the first embodiment.

As shown in FIG. 13, the configuration of the voice interaction device 100C according to the fourth embodiment differs from the configuration of the voice interaction device 100 according to the first embodiment described above with reference to FIG. 1 in that an emotion determination unit 112 is added. The components of the fourth embodiment that are different from those of the first embodiment and the components having an operation different from that of the first embodiment will be described below.

The emotion determination unit 112 determines the internal emotion of the interactive robot 200 when the interaction determination unit 103 determines that the interactive robot is making conversation with the conversation partner. The emotion determination unit 112 may have a function for determining the internal emotion of the interactive robot 200 based on a response sentence generated by the speech control unit 108, or may acquire the internal emotion of the interactive robot 200 from a component (not shown) that determines the internal emotion of the interactive robot 200. For example, words representing emotions, or words related to an action, an event, an incident, and the like that are associated with some emotions, may be extracted from the response sentence, and the internal emotion of the interactive robot may be determined based on the extracted words. However, the particular method for determining the internal emotion of the interactive robot is not essential for the present invention, and various well-known methods can be used. In the fourth embodiment, the internal emotion of the interactive robot 200 is determined to be normal, joy, or anger. However, the classification of the internal emotion of the interactive robot can be arbitrarily set.

The eye control unit 105 determines the size of each of the pupils of the interactive robot 200 displayed on the display panels 106, based on the distance between the interactive robot and the conversation partner that is measured by the distance measurement unit 104 and the internal emotion of the interactive robot 200 that is determined by the emotion determination unit 112. How to change the size of each pupil depending on the internal emotion of the interactive robot can be arbitrarily set. For example, the eye control unit 105 may set the size of each pupil when the internal emotion determined by the emotion determination unit 112 is normal to be larger than that when the internal emotion determined by the emotion determination unit 112 is not normal (joy or anger), or may set the size of each pupil when the internal emotion determined by the emotion determination unit 112 is normal to be smaller than that when the internal emotion determined by the emotion determination unit 112 is not normal (joy or anger).

Figure 14:
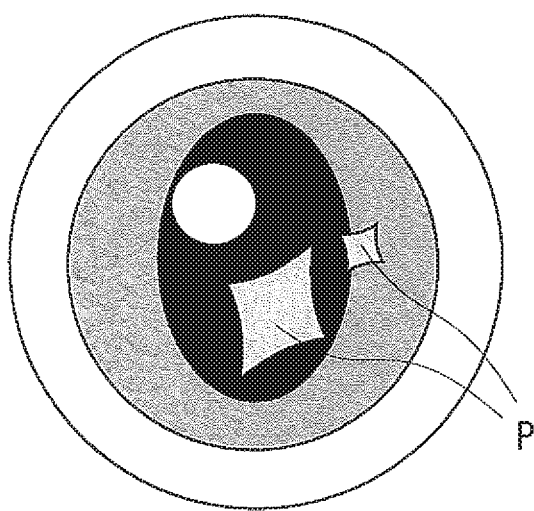
FIG. 14 is a diagram showing an example of a decoration image for emphasizing an internal emotion of joy.

Further, the eye control unit 105 may cause the display panels 106 to display a decoration image for emphasizing the internal emotion of the interactive robot 200, which is determined by the emotion determination unit 112, in the vicinity of the eyes of the interactive robot 200. For example, when the internal emotion is joy, an image P indicating that the interactive robot has stars in its eyes may be displayed as the decoration image for emphasizing joy as shown in FIG. 14.

The method for determining the size of each of the pupils of the interactive robot 200 in the fourth embodiment will be described below.

In the fourth embodiment, the size L of each pupil is derived by the above-mentioned formula (1), like in the first embodiment.

However, in the fourth embodiment, the size L of each pupil is determined based on the distance between the interactive robot and the conversation partner and the internal emotion of the interactive robot 200. Accordingly, A is derived by the following formula (5).

$$A = d_k \times e_j \quad (5)$$

where $e_j$ represents the aperture [%] of each pupil that is determined depending on the internal emotion of the interactive robot 200. The following Table 3 shows examples of $e_j$.

TABLE 3

| Internal emotion | Aperture $e_j$ [%] |
|---|---|
| joy | $e_1$ = 90 [%] |
| anger | $e_2$ = 70 [%] |
| normal | $e_3$ = 100 [%] |

Accordingly, when the example shown in Table 3 is applied, the eye control unit 105 may set the size of each pupil to be largest when the internal emotion of the interactive robot is normal, set the size of each pupil to be second largest when the internal emotion of the interactive robot is joy, and set the size of each pupil to be smallest when the internal emotion of the interactive robot is anger.

Note that the example shown in Table 1 can be applied to the aperture $d_k$. When the examples shown in Table 1 and Table 3 are applied, the aperture $d_k$ of each pupil that is determined depending on the distance between the interactive robot and the conversation partner is 10 to 100 [%], while the aperture $e_j$ of each pupil that is determined depending on the internal emotion of the interactive robot is 70 to 100 [%]. Accordingly, the size of each pupil depends more on the distance between the interactive robot and the conversation partner than on the internal emotion of the interactive robot. Note that the ranges of $d_k$ and $e_j$ are not limited to those in the examples shown in Table 1 and Table 3, and may be arbitrarily set as long as the size of each pupils depends more on the distance between the interactive robot and the conversation partner.

(4-2) Operation of Fourth Embodiment

Figure 15:
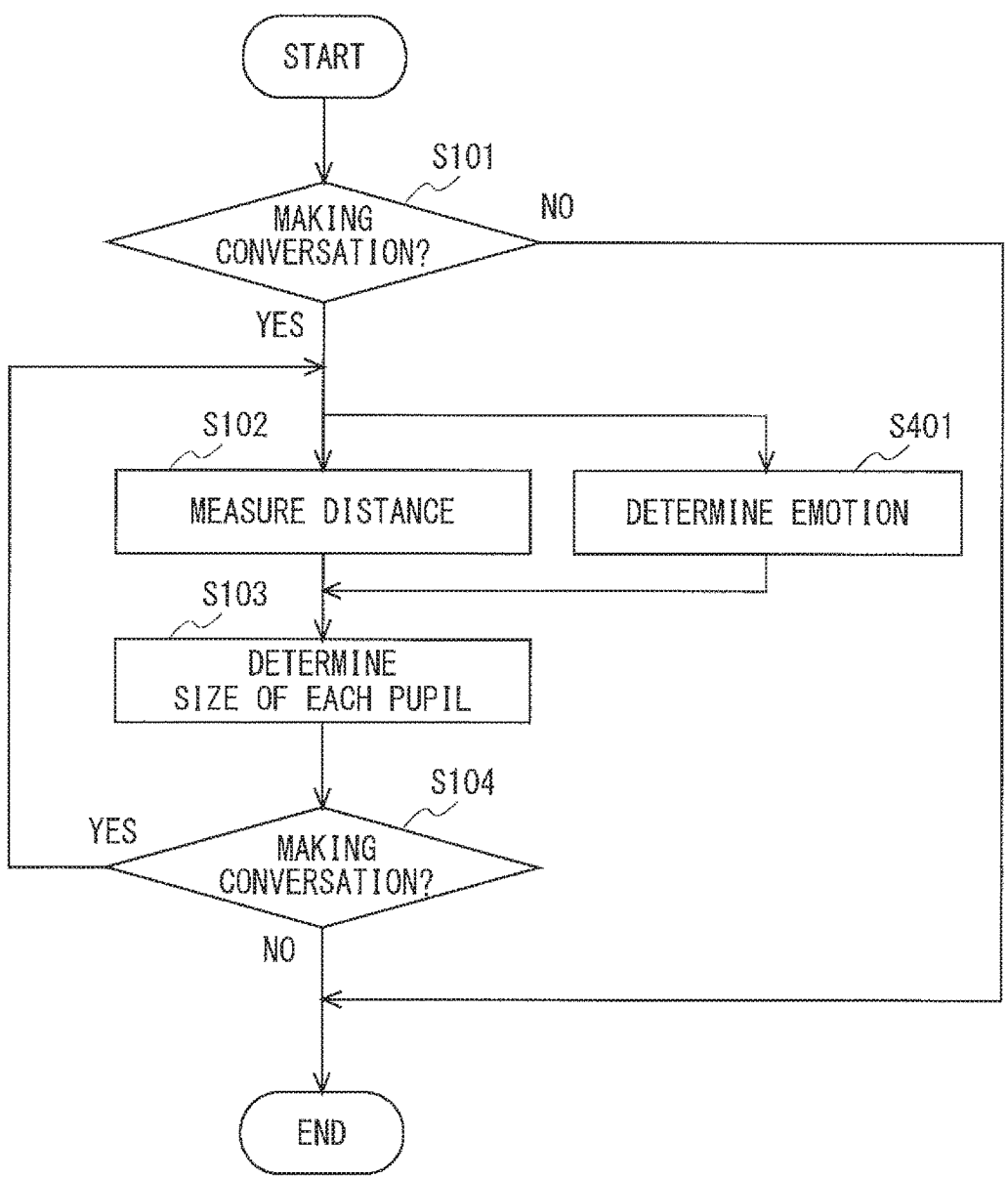
FIG. 15 is a flowchart showing an example of an operation associated with control for the eyes of an interactive robot in the voice interaction device according to the fourth embodiment.

Next, the operation of the fourth embodiment will be described. FIG. 15 is a flowchart showing an example of an operation associated with control for the eyes of the interactive robot 200 in the voice interaction device 100C according to the fourth embodiment. The process shown in FIG. 15 differs from the process in the first embodiment described above with reference to FIG. 7 in that step S401 is added.

As shown in FIG. 15, first, the process of step S101 similar to that shown in FIG. 7 is carried out. When it is not determined that the interactive robot is making conversation with the conversation partner in step S101 (NO in step S101), the process ends.

On the other hand, when it is determined that the interactive robot is making conversation with the conversation partner in step S101 (YES in step S101), the emotion determination unit 112 determines the internal emotion of the interactive robot 200 (step S401), in parallel with the process of step S102 similar to that shown in FIG. 7. Note that when the internal emotion of the interactive robot cannot be determined, for example, because the speech control unit 108 has not generated a response sentence, immediately after the voice interaction is started, the internal emotion of the interactive robot may be determined to be normal. In the subsequent step S103, the eye control unit 105 determines the size of each of the pupils of the interactive robot 200 displayed on the display panels 106, based on the distance between the interactive robot and the conversation partner that is measured by the distance measurement unit 104 and the internal emotion determined by the emotion determination unit 112, and sets the size of each of the pupils displayed on the display panels 106 to the determined size. At this time, the eye control unit 105 can determine the size of each pupil by using, for example, the aperture A of each pupil to which the examples shown in Table 1 and Table 3 are applied and Formula (1).

After that, the process of step S104 similar to that shown in FIG. 7 is carried out. When it is not determined that the interactive robot is making conversation with the conversation partner in step S104 (NO in step S104), the process ends. On the other hand, when it is determined that the interactive robot is making conversation with the conversation partner in step S104 (YES in step S104), the process returns to steps S102 and S401, and the process of steps S102 and S401 and subsequent steps is carried out.

(4-3) Advantageous Effects of Fourth Embodiment

As described above, the voice interaction device 100C according to the fourth embodiment determines the internal motion of the interactive robot 200 and changes the size of each of the pupils of the interactive robot 200 displayed on the display panels 106 depending on the determined internal motion of the interactive robot. Accordingly, the size of each of the pupils of the interactive robot 200 is changed depending on the content of the speech of the conversation partner. Therefore, the interactive robot 200 can show the conversation partner that the interactive robot 200 has recognized the content of the speech. This allows the conversation partner to have a sense of affinity in the interactive robot 200 or have a sense of emotional attachment to the interactive robot 200.

The other advantageous effects are similar to those of the first embodiment.

Note that the present invention is not limited to the above embodiments and can be modified as appropriate without departing from the scope of the invention. For example, the above embodiments have been described as independent embodiments, but instead may be combined as appropriate. Specifically, the second and fourth embodiments may be combined, or the third and fourth embodiments may be combined.

Further, when the volume of collected sound collected by the microphone exceeds a threshold and the conversation partner is captured in the photographed image photographed by the camera, the voice interaction device determines that the interactive robot is making conversation with the conversation partner, and the voice interaction device controls the eyes of the interactive robot only when the interactive robot is making conversation with the conversation partner. However, the operation of the voice interaction device is not limited to this. The generation of a response sentence for the speech voice of the conversation partner and the output of sound may be performed only when the interactive robot is making conversation with the conversation partner.

Further, the voice interaction device controls the eyes of the interactive robot only when the interactive robot is making conversation with the conversation partner. However, the voice interaction device may control the eyes of the interactive robot also when it is not determined that the interactive robot is making conversation with the conversation partner. For example, when the conversation partner is captured in the photographed image and the volume of sound does not exceed the threshold, it indicates that the conversation partner is interested in making a speech and waiting. In this case, the size of each of the pupils of the interactive robot may be increased, or the decoration image P as shown in FIG. 14 may be displayed. Further, when the conversation partner is not captured in the photographed image and the volume of sound does not exceed the threshold, the interactive robot may be controlled to have sleepy eyes or closed eyes. Furthermore, when the conversation partner is not captured in the photographed image and the volume of sound exceeds the threshold, the size of each of the pupils of the interactive robot may be reduced, or the lines of sight of the eyes of the interactive robot may be moved vertically or horizontally, to indicate that the interactive robot is on the alert.

The components other than the microphone, the camera, the display panels, and the speaker, which are included in the voice interaction device, can be implemented by, for example, a processor (not shown) and a memory (not shown) which are included in a computer. Specifically, the components can be implemented by causing the processor to read out software (program) from the memory and execute the software. Further, the implementation of the components is not limited to the software implementation using a program, but instead the components may be implemented by, for example, any combination of hardware, firmware, and software.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-recordable), CD-R/W (CD-rewritable), and semiconductor memories (such as mask ROM, PROM (Programmable ROM), EPROM (Erasable PROM), flash ROM, RAM (Random Access Memory), etc.).

The above-mentioned program may be provided to a computer using any type of transitory computer readable media. Examples of transitory computer readable media include electric signals, optical signals, and electromagnetic waves. Transitory computer readable media can provide the program to a computer via a wired communication line, such as an electric wire and an optical fiber, or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A voice interaction device that is incorporated in an interactive robot, comprising:
   a display unit disposed at positions of eyes of the interactive robot and configured to display the eyes of the interactive robot;
   a distance measurement unit configured to measure a distance between the interactive robot and a conversation partner; and
   an eye control unit configured to set a size of each of pupils of the interactive robot displayed on the display unit when the distance measured by the distance measurement unit is less than a predetermined distance to be larger than a size of each of the pupils displayed on the display unit when the measured distance is equal to or more than the predetermined distance.

2. The voice interaction device according to claim 1, wherein when the measured distance is less than the predetermined distance, the eye control unit sets the size of each of the pupils displayed on the display unit when the measured distance is short to be larger than the size of each of the pupils displayed on the display unit when the measured distance is long.

3. The voice interaction device according to claim 1, further comprising a brightness acquisition unit configured to acquire a brightness of an installation environment in which the interactive robot is installed,
   wherein the eye control unit controls the size of the pupils displayed on the display unit when the brightness of the installation environment acquired by the brightness acquisition unit is less than a predetermined brightness to be larger than the size of each of the pupils displayed on the display unit when the brightness of the acquired installation environment is equal to or higher than the predetermined brightness.

4. The voice interaction device according to claim 1, further comprising a time zone determination unit configured to determine which one of a plurality of preset time zones a current time belongs to, wherein the eye control unit holds data on brightness of each of the plurality of time zones, and the eye control unit sets the size of each of the pupils displayed on the display unit when the time zone determined by the time zone determination unit has a low brightness to be larger than the size of each of the pupils displayed on the display unit when the time zone determined by the time zone determination unit has a high brightness.

5. The voice interaction device according to claim 1, further comprising an emotion determination unit configured to determine an internal emotion of the interactive robot, wherein the eye control unit changes the size of each of the pupils displayed on the display unit depending on the internal emotion determined by the emotion determination unit.

6. The voice interaction device according to claim 5, wherein the eye control unit controls the display unit to display a decoration image for emphasizing the internal emotion determined by the emotion determination unit.

7. A control method for a voice interaction device incorporated in an interactive robot, the control method comprising:

disposing a display unit at positions of eyes of the interactive robot and displaying the eyes of the interactive robot on the display unit, measuring a distance between the interactive robot and a conversation partner;

determining whether or not the measured distance is less than a predetermined threshold distance; and setting a size of each of pupils of the interactive robot displayed on the display unit when the measured distance is less than the predetermined distance to be larger than a size of each of the pupils displayed on the display unit when the measured distance is equal to or more than the predetermined distance.

* * * * *